Patented Feb. 1, 1927.

1,616,366

UNITED STATES PATENT OFFICE.

HANS HAHL, OF ELBERFELD, GERMANY, ASSIGNOR TO WINTHROP CHEMICAL COMPANY, INC., OF NEW YORK, N. Y.

PHARMACEUTICAL PRODUCT.

No Drawing. Application filed December 16, 1925, Serial No. 75,874, and in Germany February 19, 1925.

The present invention concerns the production of the hitherto unknown complex antimony compounds being derived from mercaptocarboxylic acids e. g. the antimony sodium salt of thioglycollic acid having most probably the formula:

$$Sb(S.C_6H_4COONa)_5$$

They are slightly yellowish to whitish powders of an almost neutral reaction soluble in water, being valuable spirillocides.

In order to illustrate the new process more fully the following example is given:—

An aqueous solution of 20 parts by weight of thioglycollic acid and 11 parts by weight of pentoxide of antimony are heated together with 500 parts by weight of water until the oxide is dissolved. The filtrate is neutralized with sodium carbonate, while still hot, and is evaporated to dryness at a low temperature. The sodium antimony salt is a whitish crystalline powder soluble in hot water with an almost neutral reaction. By treatment with $Na_2S$ the antimony is precipitated.

It contains about 18.3% of antimony. The free acid can be obtained by treating the solution of the sodium salt with an acid. It contains about 40% Sb.

The other complex products are prepared in an analogous manner.

I claim:

1. The process of producing complex antimony compounds of thioglycollic acid, which process consists in treating the thioglycollic acid with an oxy derivative of pentavalent antimony and isolating the antimony compound in the shape of the antimony alkali metal salts.

2. The process of producing complex antimony compounds of thioglycollic acid, which process consists in treating the thioglycollic acid with an oxy derivative of pentavalent antimony and isolating the antimony compound in the shape of the antimony earth alkali metal salts.

3. The herein described complex pentavalent antimony compounds of thioglycollic acid, being whitish powders soluble in water with an almost neutral reaction and being valuable spirillocides, substantially as described.

4. The herein described sodium salt of the complex antimony compound of thioglycollic acid having most probably the following formula:

$$Sb(SC_6H_4.COONa)_5$$

being a whitish crystalline powder, soluble in water with a neutral alkaline reaction being a valuable spirillocide and containing about 18.3% of Sb. substantially as described.

In testimony whereof I have hereunto set my hand.

HANS HAHL.